United States Patent
Wu

(10) Patent No.: US 12,428,762 B2
(45) Date of Patent: Sep. 30, 2025

(54) NONWOVEN MAT WITH REDUCED PERMEABILITY AND INCREASED CALIPER

(71) Applicant: Owens Corning Intellectual Capital, LLC, Toledo, OH (US)

(72) Inventor: Jianhui Wu, Westerville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 396 days.

(21) Appl. No.: 17/781,164

(22) PCT Filed: Nov. 17, 2020

(86) PCT No.: PCT/US2020/060854
§ 371 (c)(1),
(2) Date: May 31, 2022

(87) PCT Pub. No.: WO2021/118766
PCT Pub. Date: Jun. 17, 2021

(65) Prior Publication Data
US 2023/0002945 A1 Jan. 5, 2023

Related U.S. Application Data

(60) Provisional application No. 62/946,464, filed on Dec. 11, 2019.

(51) Int. Cl.
| | |
|---|---|
| *D04H 1/587* | (2012.01) |
| *D04H 1/4218* | (2012.01) |
| *D04H 1/4242* | (2012.01) |
| *D04H 1/64* | (2012.01) |

(52) U.S. Cl.
CPC .......... *D04H 1/587* (2013.01); *D04H 1/4218* (2013.01); *D04H 1/4242* (2013.01); *D04H 1/64* (2013.01); *D10B 2101/06* (2013.01); *D10B 2101/08* (2013.01); *D10B 2101/12* (2013.01)

(58) Field of Classification Search
CPC .... D04H 1/587; D04H 1/4218; D04H 1/4242; D04H 1/64; D10B 2101/06; D10B 2101/08; D10B 2101/12
See application file for complete search history.

(56) References Cited

U.S. PATENT DOCUMENTS

| | | | |
|---|---|---|---|
| 4,446,177 A | 5/1984 | Munoz et al. | |
| 5,540,963 A | 7/1996 | Wong | |
| 6,497,787 B1 | 12/2002 | Geel | |
| 6,607,997 B1 | 8/2003 | Cox et al. | |
| 7,435,694 B2 | 10/2008 | Kajander | |
| 7,732,032 B2 | 6/2010 | Dubey | |
| 9,981,430 B2 | 5/2018 | Jones et al. | |
| 2003/0000663 A1* | 1/2003 | Geel | D21H 21/54 |
| | | | 162/158 |
| 2004/0069020 A1 | 4/2004 | Hindi et al. | |
| 2005/0112981 A1 | 5/2005 | Nanko et al. | |
| 2006/0131362 A1 | 6/2006 | Bergenudd et al. | |
| 2007/0202326 A1 | 8/2007 | Geel et al. | |
| 2011/0274908 A1 | 11/2011 | Kowata et al. | |
| 2014/0323002 A1* | 10/2014 | Qin | C09D 123/06 |
| | | | 442/79 |
| 2017/0037549 A1 | 2/2017 | Good et al. | |
| 2017/0306562 A1 | 10/2017 | Phipps et al. | |
| 2018/0280845 A1 | 10/2018 | Barlow, Jr. et al. | |
| 2020/0347197 A1* | 11/2020 | Nordin | C08J 9/0066 |

FOREIGN PATENT DOCUMENTS

| | | |
|---|---|---|
| CN | 101263183 A | 9/2008 |
| EP | 2964363 A1 | 1/2016 |
| EP | 2985374 A1 | 2/2016 |
| GB | 1427647 A | 3/1976 |
| JP | 2018058280 A | 4/2018 |
| WO | 0179600 A2 | 10/2001 |
| WO | 2006068574 A1 | 6/2006 |
| WO | 2015170262 A1 | 11/2015 |
| WO | 2018122718 A1 | 7/2018 |
| WO | 2018169851 A1 | 9/2018 |
| WO | 2018235905 A1 | 12/2018 |
| WO | 2019101749 A1 | 5/2019 |
| WO | 2019231994 A1 | 12/2019 |

OTHER PUBLICATIONS

International Search Report and Written Opinion from PCT/US2020/060854 dated Mar. 11, 2021.
Lubrizol Performance Coatings—"Carboset 3076 Acrylic Dispersion"—https://www.lubrizol.com/Coatings/Products/Carboset-3076 (accessed on Oct. 28, 2019).
Office Action from CN Application No. 202080085855.2 dated Jul. 25, 2023.
Office Action from CN Application No. 202080085855.2 dated Mar. 11, 2023.
Office Action from CA Application No. 3,164,193 dated May 7, 2025.

* cited by examiner

*Primary Examiner* — Jeremy R Pierce
(74) *Attorney, Agent, or Firm* — Calfee, Halter & Griswold LLP

(57) ABSTRACT

A nonwoven mat and a method of making a nonwoven mat are provided. The nonwoven mat includes reinforcing fibers and a binder composition that includes a polycarboxy polymer and polymer microspheres. The binder composition may also include low-density fibers, such as microfibrillated cellulose fibers. The polymer microspheres have a thermoplastic shell that encapsulates a blowing agent. The thermoplastic shell has magnesium hydroxide on its outer surface. The components of the binder composition interact with one another and/or the reinforcing fibers to form a nonwoven mat having a less permeable structure and a higher caliper.

13 Claims, No Drawings

NONWOVEN MAT WITH REDUCED PERMEABILITY AND INCREASED CALIPER

CROSS-REFERENCE TO RELATED APPLICATIONS

This application is the U.S. national stage entry of PCT/US2020/060854, filed Nov. 17, 2020, which claims priority to and all benefit of U.S. Provisional Patent Application No. 62/946,464, filed on Dec. 11, 2019, the entire disclosures of which are fully incorporated herein by reference.

FIELD

The general inventive concepts relate to nonwoven mats and, more particularly, to nonwoven mats that have a less permeable structure and a higher caliper as a result of the interaction of components present in a binder composition used to form the nonwoven mats. The nonwoven mats may be used in a variety of applications and products, such as facers for gypsum boards, office wall panels, and/or polyisocyanurate foam boards.

BACKGROUND

Glass nonwovens (e.g., mats, veils, webs) are utilized in a variety of applications. For example, nonwoven glass mats are used as facers for gypsum boards and polyisocyanurate ("polyiso") boards. One problem associated with nonwoven glass mats used as facers for gypsum and polyiso boards is that the nonwoven glass mats are somewhat permeable, which leads to the gypsum or polyiso material bleeding through the nonwoven glass mat. A known solution to the bleed-through problem is to provide a coating layer containing inorganic fillers and a polymer binder on a surface of a pre-formed nonwoven glass mat. The coating layer fills void spaces in the nonwoven glass mat to make the nonwoven glass mat less permeable.

However, application of a coating layer to the nonwoven glass mat requires additional raw materials to form the coating material and additional processing equipment, both of which increase the cost of producing the nonwoven glass mat. In addition, application of a coating layer increases the basis weight of the nonwoven glass mat, which may further increase the costs (e.g., transportation costs) associated with the coated nonwoven glass mat.

SUMMARY

The general inventive concepts relate to a nonwoven mat that includes a plurality of reinforcing fibers and a binder composition that contains a polycarboxy polymer and a plurality of polymer microspheres, and a method of making such a nonwoven mat. To illustrate various aspects of the general inventive concepts, several exemplary embodiments of nonwoven mats, binder compositions, and methods of making the nonwoven mats are disclosed.

In one exemplary embodiment, a nonwoven mat is provided. The nonwoven mat includes a plurality of reinforcing fibers and a binder composition that contains a polycarboxy polymer and a plurality of polymer microspheres. Each of the polymer microspheres have a thermoplastic shell that encapsulates a blowing agent, and magnesium hydroxide distributed throughout the thermoplastic shell.

In one exemplary embodiment, a method of making a nonwoven mat is provided. The method includes the steps of: a) depositing an aqueous reinforcing fiber slurry onto a processing line to form a wet laid mat having a first major surface and a second major surface; b) applying a binder composition to at least one of the first major surface and the second major surface of the wet laid mat, wherein the binder composition comprises a polycarboxy polymer and a plurality of polymer microspheres, and each of the polymer microspheres comprises a thermoplastic shell encapsulating a blowing agent, and magnesium hydroxide distributed throughout the thermoplastic shell; and c) heating the wet laid mat to cure the binder composition and cause the polymer microspheres to expand, thereby forming the nonwoven mat.

In one exemplary embodiment, a binder composition is provided. The binder composition includes a polycarboxy polymer and a plurality of microspheres. Each of the polymer microspheres have a thermoplastic shell that encapsulates a blowing agent, and magnesium hydroxide distributed throughout the thermoplastic shell.

Numerous other aspects, advantages, and/or features of the general inventive concepts will become more readily apparent from the following detailed description of exemplary embodiments.

DETAILED DESCRIPTION

While the general inventive concepts are susceptible of embodiment in many different forms, several embodiments are described herein in detail with the understanding that the present disclosure is to be considered an exemplification of the principles of the general inventive concepts. Accordingly, the general inventive concepts are not intended to be limited to the specific embodiments described herein.

The materials and methods described herein are intended to be used to provide nonwoven articles with improved characteristics. More specifically, nonwoven mats having a less permeable (i.e., more closed) structure and increased caliper (i.e., thickness) are disclosed. It is believed that the interactions between components of the binder composition used to form the nonwoven mats synergistically provide a less permeable structure and increased caliper. Both characteristics are desirable when the nonwoven mats are used as facer materials for gypsum boards and polyiso boards, as both characteristics can substantially reduce or prevent bleed-through of the gypsum and polyiso material when these materials are deposited onto the nonwoven mat.

The terms "binder" and "binder composition," are used interchangeably herein to mean a material that holds one or more components of a nonwoven article together. Those of ordinary skill in the art will understand that a binder composition is often an aqueous mixture or solution of dissolved ingredients that is cured to bond reinforcing fibers together.

The term "polymer microspheres," as used herein, refers to particles of thermoplastic resin material that have a blowing agent encapsulated therein and which expand upon heating.

The term "low-density fiber," as used herein, refers generally to fibers which have one or more of the following characteristics: i) the fiber can be easily dispersed and suspended into an aqueous solution or binder composition without sedimentation over time (e.g., over a 24-hour period); and ii) the fiber can flow easily when the fiber/binder composition is applied on a nonwoven mat in a wet-laid process with a relatively low viscosity (e.g., a viscosity of less than 500 cps at room temperature). In certain embodiments, the low-density fiber may have a fiber length of less than 1 mm. Fiber lengths such as this prevent excess fiber buildup over time, which can reduce line cleanup and downtime.

Ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

In an exemplary embodiment, the general inventive concepts relate to a nonwoven mat. The nonwoven mat comprises a plurality of reinforcing fibers and a binder composition comprising a polycarboxy polymer and a plurality of polymer microspheres. Each of the polymer microspheres comprises a thermoplastic shell encapsulating a blowing agent, and magnesium hydroxide distributed throughout the thermoplastic shell, which means that magnesium hydroxide is present on an inner surface of the thermoplastic shell, magnesium hydroxide is present on an outer surface of the thermoplastic shell, and magnesium hydroxide is present within the material forming the thermoplastic shell.

In an exemplary embodiment, the general inventive concepts relate to a method of making a nonwoven mat. The method includes the steps of: a) depositing an aqueous reinforcing fiber slurry onto a processing line to form a wet laid mat having a first major surface and a second major surface; b) applying a binder composition to at least one of the first major surface and the second major surface of the wet laid mat, wherein the binder composition comprises a polycarboxy polymer and a plurality of polymer microspheres, wherein each of the polymer microspheres comprises a thermoplastic shell encapsulating a blowing agent, and magnesium hydroxide distributed throughout the thermoplastic shell; and c) heating the wet laid mat to cure the binder composition and cause the polymer microspheres to expand, thereby forming the nonwoven mat.

In an exemplary embodiment, the general inventive concepts relate to a construction board comprising a substrate and a nonwoven mat attached to the substrate. The nonwoven mat comprises a plurality of reinforcing fibers and a binder composition comprising a polycarboxy polymer and a plurality of polymer microspheres. Each of the polymer microspheres comprises a thermoplastic shell encapsulating a blowing agent, and magnesium hydroxide distributed throughout the thermoplastic shell. In certain embodiments, the binder composition comprises a plurality of low-density fibers, as described herein. In certain embodiments, the substrate comprises gypsum. In certain embodiments, the substrate comprises a foam.

Nonwoven mats according to the general inventive concepts may be formed using conventional processes including, but not limited to, wet laid processes. For example, in a wet laid process, wet chopped reinforcing fibers are dispersed in a water slurry that contains surfactants, viscosity modifiers, defoaming agents, and/or other chemical agents. The slurry containing the chopped reinforcing fibers is then agitated so that the reinforcing fibers become dispersed throughout the slurry. The slurry containing the reinforcing fibers is deposited onto a moving screen where a substantial portion of the water is removed to form a web of randomly oriented reinforcing fibers. A binder composition is then applied, and the resulting nonwoven mat is dried to remove any remaining water and to cure the binder composition. The formed nonwoven mat is an assembly of dispersed, individual chopped reinforcing fibers interconnected by the binder composition.

Nonwoven mats comprised of reinforcing fibers are used in a variety of applications. For example, nonwoven fiberglass mats are used as reinforcement in ceiling tiles, roofing shingles, and construction boards (e.g., wall boards, insulation boards), among other applications. The mats are used to provide strength and other favorable properties to the ultimate product. One drawback of nonwoven fiberglass mats is the relatively permeable structure of the mat, especially when used to form a construction board comprised of gypsum or polyiso materials. While a relatively permeable structure may be desirable in certain applications, it can be a hindrance in other applications. In general, when using a nonwoven fiberglass mat to form a gypsum wall board or a polyiso insulation board, the nonwoven fiberglass mat requires additional binder materials to "close" the voids present in the mat (i.e., to reduce its permeability) to prevent bleed-through. Due to issues such as increased viscosity, additional binder materials can only be added to a binder composition up to a certain point. Thus, nonwoven fiberglass mats used as a facer material for gypsum boards and polyiso boards often require a second application (or more) of a binder composition or even a separately applied coating layer to provide the nonwoven mat with a desired level of permeability. These solutions, however, increase the loss on ignition (LOI) (a measure of the amount of binder composition present in the nonwoven mat) and the basis weight of the nonwoven mat and, hence, the overall cost of the nonwoven mat. Accordingly, there is a need for a nonwoven mat that is sufficiently closed to prevent bleed-through without having to significantly increase the LOI and/or the basis weight of the nonwoven mat.

The general inventive concepts are based, at least in part, on the discovery that nonwoven mats formed with a binder composition that includes a polycarboxy compound and polymer microspheres exhibit reduced permeability and increased caliper. It is believed that the interaction between the polycarboxy compound and the polymer microspheres present in the binder composition lead to the reduced permeability and the increased caliper of the resulting nonwoven mats. The reduced permeability and increased caliper are also achieved without having to significantly increase the LOI or the basis weight of the nonwoven mat.

In accordance with the present disclosure, a nonwoven mat comprises a plurality of reinforcing fibers and a binder composition comprising a polycarboxy polymer and a plurality of polymer microspheres. Each of the polymer microspheres comprises a thermoplastic shell encapsulating a blowing agent, and magnesium hydroxide distributed throughout the thermoplastic shell.

The nonwoven mat of the present disclosure may be formed from a variety of reinforcing fibers. Exemplary reinforcing fibers for forming the nonwoven mat of the present disclosure include, but are not limited to, glass fibers, synthetic fibers (e.g., polyester fibers, polyethylene fibers, polypropylene fibers, polyethylene terephthalate fibers, polyamide fibers, aramid fibers, polyaramid fibers), mineral fibers, cellulose fibers, carbon fibers, ceramic fibers, or a blend of two or more different types of reinforcing fibers.

In certain embodiments of the present disclosure, the nonwoven mat comprises glass fibers as the reinforcing fibers. The glass fibers can be made from any suitable type of glass. Exemplary glass fibers include, but are not limited to, A-type glass fibers, C-type glass fibers, E-type glass fibers, S-type glass fibers, ECR-type glass fibers (e.g., Advantex® glass fibers commercially available from Owens Corning of Toledo, Ohio), wool glass fibers, and combinations thereof.

The glass fibers used to form the nonwoven mat may have a variety of fiber diameters. In certain embodiments, the glass fibers used to form the nonwoven mat have an average fiber diameter of 6.5 microns to 20 microns. In certain embodiments, the glass fibers used to form the nonwoven mat have an average fiber diameter of 10 microns to 18 microns. In certain other embodiments, the glass fibers used to form the nonwoven mat have an average fiber diameter of 13 microns to 16 microns.

It is also contemplated that a blend of glass fibers having different fiber diameters, such as a blend of smaller diameter glass fibers (e.g., average fiber diameter of 6.5 microns to 10 microns) and larger diameter glass fibers (e.g., average fiber diameter of 13 microns to 16 microns) may be used to form the nonwoven mat. In certain embodiments, the plurality of reinforcing fibers of the nonwoven mat comprise a blend of 50% to 70% by weight first glass fibers and 30% to 50% by weight second glass fibers, wherein the first glass fibers have an average fiber diameter of 13 microns and the second glass fibers have an average fiber diameter of 10 microns. In certain embodiments, the plurality of reinforcing fibers of the nonwoven mat comprise a blend of 55% to 65% by weight first glass fibers and 35% to 45% by weight second glass fibers, wherein the first glass fibers have an average fiber diameter of 13 microns and the second glass fibers have an average fiber diameter of 10 microns. In certain embodiments, the plurality of reinforcing fibers of the nonwoven mat comprise a blend of 60% by weight first glass fibers and 40% by weight second glass fibers, wherein the first glass fibers have an average fiber diameter of 13 microns and the second glass fibers have an average fiber diameter of 10 microns.

The glass fibers used to form the nonwoven mat may also have a variety of fiber lengths. In certain embodiments, the glass fibers used to form the nonwoven mat have an average fiber length of 0.25 inches (6.35 mm) to 2 inches (50.8 mm). In certain embodiments, the glass fibers used to form the nonwoven mat have an average fiber length of 0.5 inches (12.7 mm) to 1.5 inches (38.1 mm). In certain other embodiments, the glass fibers used to form the nonwoven mat have an average fiber length of 0.75 inches (19.05 mm) to 1 inch (25.4 mm). In certain embodiments, the glass fibers used to form the nonwoven mat have an average fiber length of 0.25 inches (6.35 mm) to 0.5 inches (12. mm), including an average fiber length of 0.39 inches (10 mm). It is also contemplated that a blend of glass fibers having different fiber lengths, such as a blend of shorter glass fibers (e.g., average fiber length of 0.25 inches (6.35 mm) to 0.5 inches (12.7 mm)) and longer glass fibers (e.g., average fiber length of 0.75 inches (19.05 mm) to 1.25 inches (31.75 mm)) may be used to form the nonwoven mat. In certain embodiments, the plurality of reinforcing fibers of the nonwoven mat comprise a blend of 60% by weight first glass fibers and 40% by weight second glass fibers, wherein the first glass fibers have an average fiber diameter of 13 microns and an average fiber length of 0.75 inches (19.05 mm), and the second glass fibers have an average fiber diameter of 10 microns and an average fiber length of 0.39 inches (10 mm).

As mentioned above, the nonwoven mat of the present disclosure also includes a binder composition that binds the reinforcing fibers together. The binder composition of the present disclosure is a thermoset binder and comprises at least one polycarboxy polymer as the thermoset binder resin. The polycarboxy polymer comprises an organic polymer or oligomer containing more than one pendant carboxy group. The polycarboxy polymer may be a homopolymer or copolymer prepared from one or more unsaturated carboxylic acids including, but not limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Alternatively, the polycarboxy polymer may be prepared from unsaturated anhydrides including, but not limited to, maleic anhydride, itaconic anhydride, acrylic anhydride, methacrylic anhydride, and the like, as well as mixtures thereof. The polymerization of these acids and anhydrides is considered to be within the abilities of one of ordinary skill in the art.

The polycarboxy polymer may additionally comprise a copolymer of one or more of the aforementioned unsaturated carboxylic acids or anhydrides and one or more vinyl compounds including, but not necessarily limited to, styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, methyl vinyl ether, vinyl acetate, and the like. In certain exemplary embodiments, the polycarboxy polymer comprises a homopolymer and/or a copolymer of acrylic acid. In certain exemplary embodiments, the polycarboxy polymer comprises poly(acrylic acid).

Examples of commercially available compositions that include a polycarboxy polymer and are suitable for use in the binder composition of the present disclosure include, but are not limited to, QR1629S, a poly(acrylic acid)/glycerin mixture available from Dow Chemical (Philadelphia, PA); Carboset® 3076, a carboxylated acrylic solution polymer based primarily on renewable resources available from Lubrizol Advanced Materials, Inc. (Brecksville, OH); Aquaset™ 100 thermosetting binder available from Dow Chemical (Philadelphia, PA); and QR1692 binder available from Dow Chemical (Philadelphia, PA).

The polycarboxy polymer may be present in the binder composition in an amount of up to 95% by weight (on a dry weight basis) of the binder composition. In certain embodiments, the polycarboxy polymer is present in the binder composition in an amount of 70% to 95% by weight (on a dry weight basis) of the binder composition, including from 80% to 95% by weight (on a dry weight basis) of the binder composition, and also including from 85% to 93% by weight (on a dry weight basis) of the binder composition. In some exemplary embodiments, the polycarboxy polymer is present in an amount of 85% to 90% by weight (on a dry weight basis) of the binder composition.

The binder composition of the present disclosure also includes a plurality of polymer microspheres. The polymer microspheres comprise particles of thermoplastic resin material that have a blowing agent encapsulated therein and which expand upon heating. In other words, each of the individual polymer microspheres comprises a thermoplastic shell that encapsulates a blowing agent. Any suitable thermoplastic resin material may be used to form the polymer microspheres. Exemplary thermoplastic resin materials that may be used to form the polymer microspheres include, but are not limited to, an acrylonitrile-based polymer or copolymer, polystyrene, styrene copolymers, polyvinyl chloride, vinyl chloride copolymers, vinylidene chloride copolymers, and the like. In embodiments of the present disclosure, the thermoplastic resin material comprises an acrylonitrile-based polymer or copolymer.

The polymer microspheres of the present disclosure also include a blowing agent encapsulated within the thermoplastic shell. The inclusion of a blowing agent permits the polymer microspheres to expand upon heating. The blowing agent may be a physical blowing agent or a chemical blowing agent. Any suitable blowing agent may be used provided that it causes the polymer microspheres to expand upon heating. Exemplary blowing agents suitable for use in the polymer microspheres of the present disclosure include, but are not limited to, isobutane, isopentane, pentane, and combinations thereof. In certain embodiments, the polymer microspheres comprise (on a dry weight basis) 1% to 20% by weight blowing agent, including 10% to 20% by weight blowing agent, 1% to 10% by weight blowing agent, and also including from 5% to 10% by weight blowing agent.

The polymer microspheres of the present disclosure also include magnesium hydroxide distributed throughout the thermoplastic shell. The amount of magnesium hydroxide distributed throughout the thermoplastic shell may be up to 5% by weight (on a dry weight basis) of the polymer microspheres. In certain embodiments, the polymer microspheres comprise (on a dry weight basis) 0.1% to 5% by weight magnesium hydroxide, including 0.25% to 4% by weight magnesium hydroxide, 0.5% to 3% by weight magnesium hydroxide, and also including 0.75% to 1.5% by weight magnesium hydroxide.

The polymer microspheres of the present disclosure generally have an average particle size (i.e., average diameter) of 5 microns to 30 microns in an unexpanded state, and an average particle size of 30 microns to 100 microns in an expanded state (i.e., upon heating). In general, the polymer microspheres of the present disclosure, upon heating, are able to expand in an amount of 1 to 6 times their original particle size. Furthermore, the expansion of the polymer microspheres is isotropic (i.e., in all directions). The isotropic expansion of the polymer microspheres contributes to the reduction of permeability and the increase in caliper of the resulting nonwoven mat, as the polymer microspheres expand in the x, y, and z directions.

Examples of commercially available polymer microspheres that are suitable for use in the binder composition of the present disclosure include, but are not limited to, Expancel 551 WU 40 polymer microspheres, Expancel 909 WU 80 polymer microspheres, and Expancel 043 WU 80 polymer microspheres, all available from Nouryon (Amsterdam, The Netherlands).

The polymer microspheres may be present in the binder composition in an amount of up to 30% by weight (on a dry weight basis) of the binder composition. In certain embodiments, the polymer microspheres are present in the binder composition in an amount of 1% to 30% by weight (on a dry weight basis) of the binder composition, including from 1% to 20% by weight (on a dry weight basis) of the binder composition, including from 2% to 15% by weight (on a dry weight basis) of the binder composition, and also including from 2% to 12% by weight (on a dry weight basis) of the binder composition. In some exemplary embodiments, the polymer microspheres are present in an amount of 5% to 10% by weight (on a dry weight basis) of the binder composition.

In certain embodiments, the binder composition of the present disclosure comprises (on a dry weight basis) 70% to 95% by weight polycarboxy polymer and 1% to 30% by weight polymer microspheres. In certain embodiments, the binder composition of the present disclosure comprises (on a dry weight basis) 80% to 95% by weight polycarboxy polymer and 1% to 20% by weight polymer microspheres. In certain embodiments, the binder composition of the present disclosure comprises (on a dry weight basis) 85% to 95% by weight polycarboxy polymer and 1% to 15% by weight polymer microspheres. In certain embodiments, the binder composition of the present disclosure comprises (on a dry weight basis) 85% to 90% by weight polycarboxy polymer and 5% to 15% by weight polymer microspheres.

While not wishing to be bound by theory, it is believed that carboxylic acid groups of the polycarboxy polymer react with the magnesium hydroxide present on the outer surface of the polymer microspheres to form chemical bonds (either covalent, ionic, or otherwise) between the polycarboxy polymer and the polymer microspheres. This chemical bonding may lead to a more distributed and interconnected binder matrix in a nonwoven mat and provide an additional binding mechanism. This, in turn, may decrease the permeability and increase the caliper of the nonwoven mat due to the increased distribution of binder in all directions, as well as improve the tensile strength or other performance characteristic of the nonwoven mat.

In addition to the polycarboxy polymer and polymer microspheres, the binder composition of the present disclosure may include other components. In certain embodiments, the binder composition of the present disclosure also includes one or more of low-density fibers, a coupling agent, a biocide, a moisture resistant agent, a dust suppressing agent, an extender, or combinations thereof. In certain embodiments, the binder composition of the present disclosure includes a coupling agent and a plurality of low-density fibers in addition to the polycarboxy polymer and polymer microspheres.

In certain embodiments, the binder composition comprises low-density fibers. The use of low-density fibers in combination with the polycarboxy polymer and polymer microspheres in the binder composition can further reduce the permeability of a nonwoven mat based on the ability of the low-density fibers to occupy additional void spaces in the nonwoven mat.

In certain embodiments, the low-density fibers are selected from microfibrillated cellulose (MFC), carbon, mica, micro-clay, micro-hexagonal boron nitride, micrographite, aramid micropulp, and combinations thereof. In certain embodiments, the low-density fibers have an average fiber length of 50 microns to 1 mm, including a length of 100 microns to 500 microns. In certain embodiments, the low-density fibers have an average fiber diameter of less than 20 microns, including an average fiber diameter of 0.1 microns to 20 microns. In certain embodiments, the low-density fibers are incorporated into the binder composition in an amount of 0.01% to 25% by weight (on a dry weight basis) of the binder composition. In certain embodiments, the low-density fibers are incorporated into the binder composition in an amount of 0.1% to 15% by weight (on a dry weight basis) of the binder composition. In certain embodiments, the low-density fibers are incorporated into the binder composition in an amount of 0.5% to 10% by weight (on a dry weight basis) of the binder composition. In certain embodiments, the low-density fibers are incorporated into the binder composition in an amount of 0.5% to 5% by weight (on a dry weight basis) of the binder composition. In certain embodiments, the low-density fibers are incorporated into the binder composition in an amount of 1% to 2.5% by weight (on a dry weight basis) of the binder composition. Preferably, the low-density fibers are microfibrillated cellulose fibers having an average fiber length of 50 microns to 1 mm and an average fiber diameter of 0.1 microns to 20 microns. Examples of commercially available microfibrillated cellulose fibers that are suitable for use in the binder composition of the present disclosure include, but are not limited to, Exilva® Forte microfibrillated cellulose and Exilva® Piano microfibrillated cellulose, both available from Borregaard (Sarpsborg, Norway).

In certain embodiments, the binder composition comprises (on a dry weight basis) 70% to 95% by weight polycarboxy polymer, 1% to 30% by weight polymer microspheres, and 0.1% to 25% by weight low-density fibers. In certain embodiments, the binder composition comprises (on a dry weight basis) 80% to 95% by weight polycarboxy polymer, 1% to 15% by weight polymer microspheres, and 0.1% to 10% by weight low-density fibers. In certain embodiments, the binder composition comprises (on a dry weight basis) 85% to 95% by weight polycarboxy polymer, 5% to 10% by weight polymer microspheres, and 1% to 5% by weight low-density fibers. Preferably, the low-density fibers used in the foregoing embodiments comprise microfibrillated cellulose fibers having an average fiber length of 50 microns to 1 mm and an average fiber diameter of 0.1 microns to 20 microns.

While not wishing to be bound by theory, it is believed that certain low-density fibers, such as microfibrillated cellulose fibers, are capable of chemical bonding (either covalent, ionic, or otherwise) with functional groups in the binder composition or those on the reinforcing fibers (e.g., hydroxyl groups on the surface of glass fibers). This chemical bonding may further increase the performance characteristics of the nonwoven mat by providing a further binding mechanism.

The polymer microspheres and the low-density fibers, when present, may be present in the binder composition in a variety of weight ratios. In certain embodiments, the polymer microspheres and the low-density fibers are present in the binder composition at a weight ratio (on a dry weight basis) of the polymer microspheres to the low-density fibers of 1:1 to 20:1. In certain embodiments, the polymer microspheres and the low-density fibers are present in the binder composition at a weight ratio (on a dry weight basis) of the polymer microspheres to the low-density fibers of 1:1 to 10:1. In certain embodiments, the polymer microspheres and the low-density fibers are present in the binder composition at a weight ratio (on a dry weight basis) of the polymer microspheres to the low-density fibers of 1:1 to 5:1. In certain embodiments, the polymer microspheres and the low-density fibers are present in the binder composition at a weight ratio (on a dry weight basis) of the polymer microspheres to the low-density fibers of 1:1 to 2.5:1.

In certain embodiments, the binder composition may optionally contain at least one coupling agent. In certain embodiments, the coupling agent is a silane coupling agent. The coupling agent may be present in the binder composition in an amount from 0.01% to 5% by weight (on a dry weight basis), from 0.01% to 2.5% by weight (on a dry weight basis), from 0.1% to 0.5% by weight (on a dry weight basis), or from 0.15% to 0.25% by weight (on a dry weight basis) of the binder composition.

Non-limiting examples of silane coupling agents that may be used in the binder composition may be characterized by the functional groups including, but not limited to, alkyl, aryl, amino, epoxy, vinyl, methacryloxy, ureido, isocyanato, and mercapto. In certain embodiments, the silane coupling agent includes silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., γ-aminopropyltriethoxysilane and γ-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes.

The binder composition may optionally contain conventional additives including, but not limited to, dyes, pigments, fillers, colorants, UV stabilizers, thermal stabilizers, antifoaming agents, anti-oxidants, emulsifiers, preservatives (e.g., sodium benzoate), corrosion inhibitors, and mixtures thereof. Other additives may be added to the binder composition for the improvement of process and product performance. Such additives include lubricants, wetting agents, surfactants, antistatic agents, and/or water repellent agents. Additives may be present in the binder composition from trace amounts (such as less than about 0.1% by weight (on a dry weight basis) of the binder composition) up to about 10% by weight (on a dry weight basis) of the binder composition. In certain embodiments, the additives are present in an amount from 0.1% to 5% by weight (on a dry weight basis) of the binder composition.

The binder composition, as applied during manufacturing of the nonwoven mat, includes water to dissolve or disperse the active solids for application onto the reinforcing fibers. Water may be added in an amount sufficient to dilute the binder composition to a viscosity that is suitable for its application to the reinforcing fibers and to achieve a desired solids content on the reinforcing fibers. In particular, the binder composition may contain water in an amount from 50% to 98% by weight of the total binder composition.

In certain embodiments, the nonwoven mats of the present disclosure comprise (on a dry weight basis) 75% to 90% by weight reinforcing fibers and 10% to 25% by weight binder composition. In certain embodiments, the nonwoven mats of the present disclosure comprise (on a dry weight basis) 75% to 85% by weight reinforcing fibers and 15% to 25% by weight binder composition. In certain embodiments, the nonwoven mats of the present disclosure comprise (on a dry weight basis) 75% to 80% by weight reinforcing fibers and 20% to 25% by weight binder composition. As one of skill in the art will appreciate, the amount of binder composition present in the nonwoven mats of the present disclosure may be determined by measuring loss on ignition (LOI).

As demonstrated in the examples that follow, the nonwoven mats of the present disclosure exhibit a reduced air permeability and an increased caliper as compared to otherwise identical nonwoven mats that do not include the polymer microspheres. Moreover, the nonwoven mats of the present disclosure achieve a reduced air permeability and an increased caliper without substantially increasing the LOI (i.e., the amount of binder composition present in the nonwoven mat) or the basis weight (i.e., total weight) of the nonwoven mat. The phrase "otherwise identical" when used to compare nonwoven mats herein means that the nonwoven mats being compared have the same type and distribution of reinforcing fibers, the same LOI, the same basis weight, and the same general type of binder composition (i.e., the polycarboxy polymer in the binder composition is the same, but does not include any polymer microspheres).

In certain embodiments, the nonwoven mats of the present disclosure have an air permeability that is 5% to 35% lower than an otherwise identical nonwoven mat that does not include the polymer microspheres. In certain embodiments, the nonwoven mats of the present disclosure have an air permeability that is 15% to 30% lower than an otherwise identical nonwoven mat that does not include the polymer microspheres. In certain embodiments, the nonwoven mats of the present disclosure have an air permeability that is 20% to 30% lower than an otherwise identical nonwoven mat that does not include the polymer microspheres. In certain embodiments, the nonwoven mats of the present disclosure have an air permeability that is 25% to 30% lower than an otherwise identical nonwoven mat that does not include the polymer microspheres.

In certain embodiments, the nonwoven mats of the present disclosure have a caliper that is 20% to 55% higher than an otherwise identical nonwoven mat that does not include the polymer microspheres. In certain embodiments, the nonwoven mats of the present disclosure have a caliper that is 20% to 40% higher than an otherwise identical nonwoven mat that does not include the polymer microspheres. In certain embodiments, the nonwoven mats of the present disclosure have a caliper that is 20% to 55% higher than an otherwise identical nonwoven mat that does not include the polymer microspheres.

As previously discussed, the general inventive concepts relate to a method of forming a nonwoven mat. The method of forming a nonwoven mat of the present disclosure comprises: a) depositing an aqueous reinforcing fiber slurry onto a processing line to form a wet laid mat having a first major surface and a second major surface; b) applying a binder composition to at least one of the first major surface and the second major surface of the wet laid mat, wherein the binder composition comprises a polycarboxy polymer and a plurality of polymer microspheres, wherein each of the polymer microspheres comprises a thermoplastic shell encapsulating a blowing agent, and magnesium hydroxide distributed throughout the thermoplastic shell; and c) heating the wet laid mat to cure the binder composition and cause the polymer microspheres to expand, thereby forming the nonwoven mat.

Any one or more of the reinforcing fibers disclosed herein may be used in the methods of the present disclosure. Preferably, the reinforcing fibers comprise glass fibers. In certain embodiments, the reinforcing fibers are provided to a conveying apparatus such as a conveyor by a storage container for delivery to a mixing tank that contains various surfactants, viscosity modifiers, defoaming agents, and/or other chemical agents with agitation to disperse the reinforcing fibers and to form an aqueous reinforcing fiber slurry.

In accordance with the method of the present disclosure, the reinforcing fiber slurry is deposited onto a processing line to form a wet laid mat having a first major surface and a second major surface. The processing line may be any suitable formation apparatus capable of forming a wet laid mat including, but not limited to, a moving screen or forming wire on an inclined wire forming machine, wire cylinders, Fourdrinier machines, Stevens former, Roto former, Inver former, or Venti former machines. While on the processing line, a substantial portion of the water from the reinforcing fiber slurry is removed to form a wet laid mat of enmeshed, randomly oriented fibers. The wet laid mat has a first major surface (e.g., a top surface) and a second major surface (e.g., a bottom surface). The water may be removed from the wet laid mat by a conventional vacuum or air suction system.

The method of the present disclosure also includes applying the binder composition to at least one of the first major surface and the second major surface of the wet laid mat. The binder composition may be any of the binder compositions previously described herein. The binder composition may be applied to the wet laid mat using a suitable application method including, but not limited to, a binder wire, a spray applicator, a curtain coater, and a Foulard applicator.

In accordance with the method of the present disclosure, after the binder composition is applied to the wet laid mat, the wet laid mat is heated to remove any residual water, cure the binder composition, and cause the polymer microspheres to expand, thereby forming the nonwoven mat. The step of heating the wet laid mat may be accomplished using any known heating or drying method. Suitable heating methods that may be used in the method of the present disclosure include, but are not limited to, a rotary/thru air dryer or oven, a heated drum dryer, an infrared heating source, a hot air blower, and a microwave emitting source. In certain embodiments, the heating step comprises exposing the wet laid mat having the binder composition applied thereto to a temperature of 150° C. to 250° C. for a time period of up to 30 seconds.

The general inventive concepts also contemplate the nonwoven mats disclosed herein as a part of a construction board comprising a substrate such as gypsum or foam (polyiso). The nonwoven mats disclosed herein are particularly suited for use as a facing layer for boards made from gypsum and/or foam due to the reduced air permeability and increased caliper resulting from the binder composition that includes a polycarboxy polymer and a plurality of polymer microspheres. Nonwoven mats with reduced air permeability and increased caliper can reduce or prevent bleed-through of the gypsum or foam material. In particular, a reduced air permeability means that the nonwoven mat has less void space that would allow the gypsum or foam material to penetrate. Furthermore, a nonwoven mat with increased caliper can reduce or prevent bleed-through of the gypsum or foam material based on the greater distance that the material would have to traverse to reach an opposing surface.

Although the general inventive concepts have been described in the context of nonwoven mats, the general inventive concepts apply equally to other nonwoven materials that incorporate a binder composition including, for example, fibrous insulation. Fibrous insulation is typically manufactured by fiberizing a molten composition of glass, rock, slag, and/or polymer and spinning fine fibers from a fiberizing apparatus, such as a rotating spinner. To form an insulation product, fibers produced by the rotating spinner are drawn downwardly from the spinner towards a conveyor by a blower. As the fibers move downward, a binder composition is sprayed onto the fibers and the fibers are collected into a high loft, continuous blanket on the conveyor. The blanket containing the binder-coated fibers is then passed through a curing oven and the binder is cured. After the binder has cured, the fibrous insulation may be cut into lengths to form individual insulation products, and the insulation products may be packaged for shipping to customer locations.

In an exemplary embodiment, the general inventive concepts relate to a fibrous insulation product. The fibrous insulation product comprises a plurality of randomly oriented fibers and a binder composition applied to at least a portion of the fibers. The binder composition comprises a polycarboxy polymer and a plurality of polymer microspheres. Each of the polymer microspheres comprises a thermoplastic shell encapsulating a blowing agent, and magnesium hydroxide distributed throughout the thermoplastic shell. The binder composition may be formulated in accordance with any one of the previously described binder composition embodiments.

While particular embodiments are described herein, one of ordinary skill in the art will recognize that various other combinations of elements are possible and will fall within the scope of the general inventive concepts. Likewise, one of ordinary skill in the art will understand that the various embodiments of nonwoven mats described herein are suitable for use in a variety of applications.

EXAMPLES

In order to more thoroughly describe the general inventive concepts, the following examples are provided. In particular, the examples describe various nonwoven mats made using binder compositions according to the general inventive concepts.

Example 1

In this example, a nonwoven mat according to the present disclosure (Sample Mat 1) and a control nonwoven mat (Control Mat 1) were formed and compared. Both Sample Mat 1 and Control Mat 1 comprised a blend of 60% by weight 13 micron glass fibers and 40% by weight 10 micron fibers (based on the total weight of the glass fibers). In addition, Sample Mat 1 and Control Mat 1 each had a basis weight of 1.5 lbs/100 ft$^2$ and a LOI of 22%. The binder composition used to form Sample Mat 1 included 5% by weight (on a dry weight basis) polymer microspheres (Expancel 551WU40). The binder composition used to form Control Mat 1 was otherwise identical to the binder composition used to form Sample Mat 1 but did not include any polymer microspheres. The binder compositions for both Control Mat 1 and Sample Mat 1 were based on QR1629S from Dow Chemical (Philadelphia, PA).

Sample Mat 1 and Control Mat 1 were tested for air permeability in accordance with ASTM D737—Standard Test Method for Air Permeability of Textile Fabrics. Control Mat 1 had an air permeability of 635 CFM, whereas Sample Mat 1 had an air permeability of 518 CFM. Thus, Sample Mat 1 had an air permeability that was 18% lower than Control Mat 1, indicating that Sample Mat 1 was more closed (i.e., less open or void spaces) compared to Control Mat 1.

Example 2

In this example, a nonwoven mat according to the present disclosure (Sample Mat 2) and a control nonwoven mat (Control Mat 2) were formed and compared. Both Sample Mat 2 and Control Mat 2 comprised a blend of 60% by weight 13 micron glass fibers having an average length of 19.05 mm (0.75 inches) and 40% by weight 10 micron fibers having an average length of 10 mm (0.39 inches) (percentages based on the total weight of the glass fibers). In addition, Sample Mat 2 and Control Mat 2 each had a basis weight of about 1.5 lbs/100 ft$^2$ and a LOI of about 21%. The binder composition used to form Sample Mat 2 included 10% by weight (on a dry weight basis) polymer microspheres (Expancel 551WU40). The binder composition used to form Control Mat 2 was otherwise identical to the binder composition used to form Sample Mat 2 but did not include any polymer microspheres. The binder compositions for both Control Mat 2 and Sample Mat 2 were based on QR1629S from Dow Chemical (Philadelphia, PA) and included about 2% by weight (on a dry weight basis) microfibrillated cellulose fibers.

Sample Mat 2 and Control Mat 2 were tested for air permeability in accordance with ASTM D737—Standard Test Method for Air Permeability of Textile Fabrics. Control Mat 2 had an air permeability of about 620 CFM, whereas Sample Mat 2 had an air permeability of about 538 CFM. Thus, Sample Mat 2 had an air permeability that was 13% lower than Control Mat 2, indicating that Sample Mat 2 was more closed (i.e., less open or void spaces) compared to Control Mat 2.

Sample Mat 2 and Control Mat 2 were also tested for caliper in accordance with ASTM D1777—Standard Test Method for Thickness of Textile Materials. In particular, the caliper was tested using a motorized automatic cycling micrometer that produces a pressure of 2.75 psi on the specimen being tested. Sample Mat 2 had an average caliper of 0.811 mm, whereas Control Mat 2 had an average caliper of 0.585 mm. Thus, Sample Mat 2 had a caliper that was about 39% greater than Control Mat 2.

Example 3

In this example, nonwoven mats according to the present disclosure (Sample Mat 3 and Sample Mat 4) and a control nonwoven mat (Control Mat 3) were formed and compared. All mats were formed using 10 micron glass fibers having a length of 10 mm. In addition, all mats had a basis weight of about 1.5 lbs/100 ft$^2$ and an LOI of about 24%. The binder composition used to form Sample Mat 3 was based on QR1629S from Dow Chemical (Philadelphia, PA) and included 5% by weight (on a dry weight basis) polymer microspheres (Expancel 551WU40) and 2% by weight (on a dry weight basis) microfibrillated cellulose fibers. The binder composition used to form Sample Mat 4 was the same as Sample Mat 3, but a different grade of polymer microspheres (Expancel 043WU80) was used. The binder composition used to form Control Mat 3 was otherwise identical to the binder compositions used to form Sample Mats 3 and 4 but did not include any polymer microspheres.

The caliper of each mat was measured in accordance with ASTM D1777—Standard Test Method for Thickness of Textile Materials. In particular, the caliper was tested using a motorized automatic cycling micrometer that produces a pressure of 2.75 psi on the specimen being tested. Control Mat 3 had a caliper of about 0.577 mm, whereas Sample Mats 3 and 4 had a caliper of 0.709 mm and 0.88 mm, respectively. Thus, Sample Mats 3 and 4 exhibited calipers that were about 23% higher and about 52% higher, respectively, as compared to Control Mat 3.

The air permeability of each mat was measured in accordance with ASTM D737—Standard Test Method for Air Permeability of Textile Fabrics. Control Mat 3 had an air permeability of about 562 CFM, whereas Sample Mats 3 and 4 had an air permeability of about 520.5 CFM and 538.5 CFM, respectively. Thus, Sample Mats 3 and 4 had air permeabilities that were about 7% lower and about 4% lower, respectively, as compared to Control Mat 3, indicating that Sample Mats 3 and 4 were more closed (i.e., less open or void spaces) compared to Control Mat 3.

Example 4

In this example, nonwoven mats according to the present disclosure (Sample Mat 5 and Sample Mat 6) and a control nonwoven mat (Control Mat 4) were formed and compared. All mats were formed using 13 micron glass fibers having a length of 19.05 mm (0.75 inches). In addition, Sample Mat 5 and Control Mat 4 had a basis weight of about 1.5 lbs/100 ft$^2$, Sample Mat 6 had a basis weight of about 2 lbs/100 ft$^2$, and all mats had a target LOI of 20%. The binder composition used to form Sample Mats 5 and 6 were based on Carboset® 3076 from Lubrizol Advanced Materials, Inc. (Brecksville, OH) and included 5% by weight (on a dry weight basis) polymer microspheres (Expancel 551WU40). The binder composition used to form Control Mat 4 was otherwise identical to the binder compositions used to form Sample Mats 5 and 6 but did not include any polymer microspheres.

The air permeability of each mat was measured in accordance with ASTM D737—Standard Test Method for Air Permeability of Textile Fabrics. Control Mat 4 had an air permeability of about 2,026.75 L/m$^2$/s, and Sample Mats 5 and 6 had air permeabilities of about 2,149.25 L/m$^2$/s and 1,800 L/m$^2$/s, respectively.

The caliper of each mat was measured in accordance with ASTM D1777—Standard Test Method for Thickness of Textile Materials. In particular, the caliper was tested using a motorized automatic cycling micrometer that produces a pressure of 2.75 psi on the specimen being tested. Control Mat 4 had a caliper of about 1.18 mm, and Sample Mats 5 and 6 had calipers of about 1.01 mm and about 1.39 mm, respectively.

When forming the mats, the solids content contributed by the polymer microspheres had to be taken into account. For example, to achieve a target LOI of 20%, there needed to be 25% burnt organic content in the LOI tests as the polymer microspheres contribute 5% to the dry weight of the binder composition. However, for this example, the average LOI achieved was around 21.4% (as opposed to 25%). During production of the mats in this example it was found that the mats couldn't be cured effectively, even after the cure temperature was increased to 500° F. When evaluating the mats by scanning electron microscope (SEM) through a backscattered electron (BSE) imaging process, it was discovered that polymer microspheres had ruptured. After rupturing, the polymer microspheres would not have much of an impact on the air permeability or caliper of the mat. It was concluded that the polymer microspheres were unable to survive the curing conditions that were utilized.

As disclosed and suggested herein, the general inventive concepts relate to and contemplate an improved binder composition and nonwoven mats made using the binder composition. Furthermore, the scope of the general inventive concepts are not intended to be limited to the particular exemplary embodiments shown and described herein. From the disclosure given, those skilled in the art will not only understand the general inventive concepts and their attendant advantages, but will also find apparent various changes and modifications to the methods and systems disclosed. It is sought, therefore, to cover all such changes and modifications as fall within the spirit and scope of the general inventive concepts, as described and suggested herein, and any equivalents thereof.

What is claimed is:

1. A nonwoven mat comprising:
   a plurality of reinforcing fibers; and
   a binder composition comprising, on a dry weight basis, 70% to 95% by weight of a polycarboxy polymer and 1% to 30% by weight of a plurality of polymer microspheres, wherein the binder composition binds the plurality of reinforcing fibers together,
   wherein each of the polymer microspheres comprises a thermoplastic shell encapsulating a blowing agent, and magnesium hydroxide distributed throughout the thermoplastic shell, and
   wherein the nonwoven mat has an air permeability that is 5% to 35% lower than an otherwise identical nonwoven mat that does not include the polymer microspheres.

2. The nonwoven mat of claim 1, wherein the plurality of reinforcing fibers comprise at least one of glass fibers, mineral fibers, carbon fibers, synthetic fibers, and ceramic fibers.

3. The nonwoven mat of claim 1, wherein the polycarboxy polymer is selected from the group consisting of:
   a homopolymer or a copolymer prepared from one or more unsaturated carboxylic acids selected from the group consisting of acrylic acid, methacrylic acid, crotonic acid, isocrotonic acid, maleic acid, cinnamic acid, 2-methylmaleic acid, itaconic acid, 2-methylitaconic acid, and α,β-methyleneglutaric acid;
   a homopolymer or a copolymer prepared from one or more unsaturated anhydrides selected from the group consisting of maleic anhydride, itaconic anhydride, acrylic anhydride, and methacrylic anhydride; and
   a copolymer of one or more unsaturated carboxylic acids or unsaturated anhydrides and one or more vinyl compounds selected from the group consisting of styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, and vinyl acetate.

4. The nonwoven mat of claim 1, wherein the polycarboxy polymer comprises a homopolymer or a copolymer of acrylic acid.

5. The nonwoven mat of claim 1, wherein the nonwoven mat comprises, on a dry weight basis, 75% to 90% by weight reinforcing fibers and 10% to 25% by weight binder composition.

6. The nonwoven mat of claim 1, wherein the polymer microspheres comprise, on a dry weight basis, 0.1% to 5% by weight magnesium hydroxide.

7. The nonwoven mat of claim 1, wherein the plurality of reinforcing fibers comprises a blend of 50% to 70% by weight first glass fibers and 30% to 50% by weight second glass fibers, wherein the first glass fibers have an average fiber diameter of 13 microns and the second glass fibers have an average fiber diameter of 10 microns.

8. The nonwoven mat of claim 1, wherein the binder composition further comprises a plurality of low-density fibers selected from the group consisting of microfibrillated cellulose, carbon, mica, micro-clay, micro-graphite, micro-hexagonal boron nitride, aramid micropulp, and combinations thereof.

9. The nonwoven mat of claim 8, wherein the binder composition comprises, on a dry weight basis, 70% to 95% by weight polycarboxy polymer, 1% to 30% by weight polymer microspheres, and 0.1% to 25% by weight low-density fibers.

10. The nonwoven mat of claim 8, wherein the low-density fibers have an average fiber length of 50 microns to 1 mm and an average fiber diameter of 0.1 microns to 20 microns.

11. The nonwoven mat of claim 8, wherein a weight ratio of the polymer microspheres to the low-density fibers is 1:1 to 20:1.

12. The nonwoven mat of claim 1, wherein the nonwoven mat has a caliper that is 20% to 55% higher than an otherwise identical nonwoven mat that does not include the polymer microspheres.

13. A method of forming a nonwoven mat, the method comprising:
 a) depositing an aqueous reinforcing fiber slurry onto a processing line to form a wet laid mat having a first major surface and a second major surface;
 b) applying a binder composition to at least one of the first major surface and the second major surface of the wet laid mat, wherein the binder composition comprises, on a dry weight basis, 70% to 95% by weight of a polycarboxy polymer and 1% to 30% by weight of a plurality of polymer microspheres, wherein each of the polymer microspheres comprises a thermoplastic shell encapsulating a blowing agent, and magnesium hydroxide distributed throughout the thermoplastic shell; and
 c) heating the wet laid mat to cure the binder composition and cause the polymer microspheres to expand, thereby forming the nonwoven mat,
 wherein the nonwoven mat has an air permeability that is 5% to 35% lower than an otherwise identical nonwoven mat that does not include the polymer microspheres.

* * * * *